Guild & Garrison,

Steam Balanced Valve.

No. 382. Reissued July 29, 1856.

N. PETERS, PHOTO-LITHOGRAPHER, WASHINGTON, D. C.

UNITED STATES PATENT OFFICE.

WILLIAM H. GUILD AND WILLIAM F. GARRISON, OF BROOKLYN, NEW YORK.

IMPROVEMENT IN OPERATING VALVES IN DIRECT-ACTING STEAM-ENGINES.

Specification forming part of Letters Patent No. 12,592, dated March 27, 1855; Reissue No. 382, dated July 29, 1856.

*To all whom it may concern:*

Be it known that we, WILLIAM H. GUILD and WILLIAM F. GARRISON, of the city of Brooklyn, in the county of Kings and State of New York, have invented a new and useful Improvement in the Mode of Operating the Valves of Direct-Action Steam-Engines; and we do hereby declare that the following is a full, clear, and exact description of the same, reference being had to the accompanying drawings, forming a part of this specification, in which—

Figure 1:
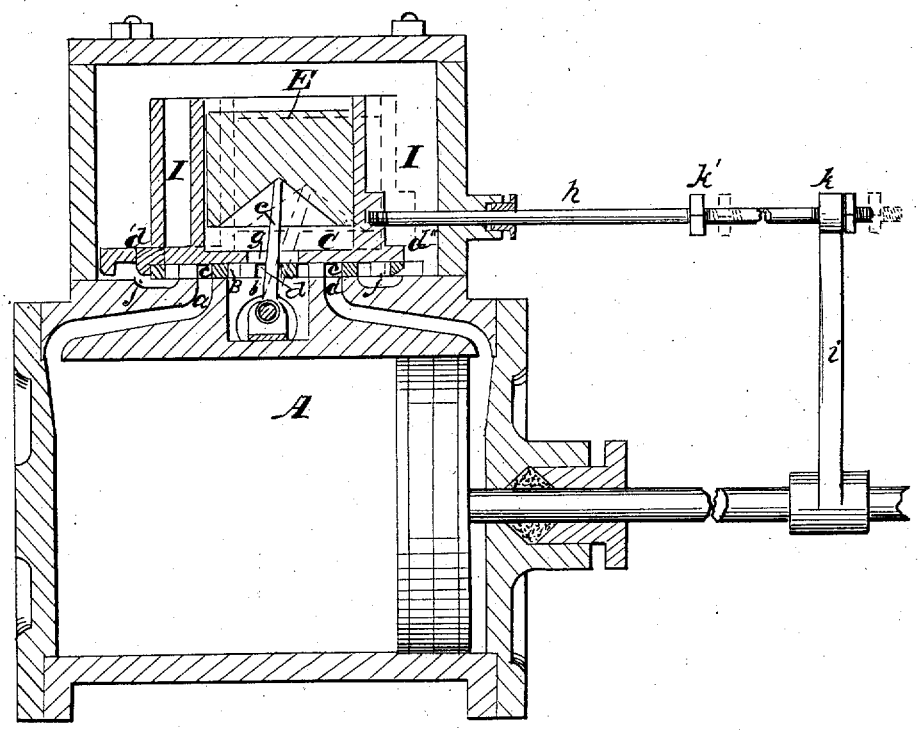
Figure 2:
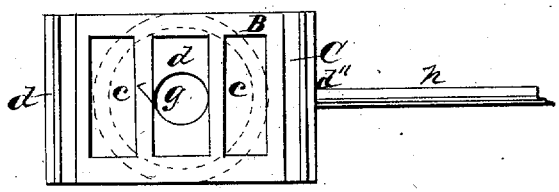

Figure 1 is a longitudinal central section of a direct-action steam-engine with our invention applied. Fig. 2 is a face view of the valve and its driver.

Similar letters of reference indicate corresponding parts in both figures.

This invention consists in certain novel, simple, and effective means whereby the valve is caused, as the stroke of the engine-piston terminates in either direction, to have imparted to it the necessary movement to admit steam to act on the piston to effect its return.

To enable others skilled in the art to make and use our invention, we will proceed to describe its construction and operation.

A is the steam-cylinder, having the steam-ports *a a'* and exhaust-port *b* arranged in the usual way in the valve-seat.

B is the valve, which may be variously constructed, but which is represented as consisting of a plate which is made parallel on its face and back, and is made with three openings, as shown in Fig. 2, which are so divided that the space between the outer edge of either of the outer openings, *c*, and that edge of the central opening, *d*, which is farthest therefrom will just include one steam-port and the exhaust-port in the valve-seat.

C is what we term the "valve-driver," which, when the valve is constructed as shown, consists of a plate faced to fit to the back of the valve and serve as a cap thereto. This plate has its ends *d' d''* lapping over the ends of the valve, and the space between the two overlapping ends should exceed the length of the valve by about the required length of stroke of the valve. It has cast with it or otherwise firmly secured to it a cylinder, D, which is bored truly perpendicularly to the valve-face to receive a piston, E, which fits to work steam-tight therein, and which is supported on the front end of a rocking arm, *e*, which rocks on an arbor or rock-shaft, *f*, working on fixed bearings placed centrally within the exhaust-cavity of the valve-seat, and passing through an opening, *g*, made through the bottom of the cylinder D. This piston has its upper or back side exposed to the pressure of steam in the steam-chest. It is connected with the valve-rod *h*, which, when the piston has arrived at a distance from the end of its stroke equal to about twice the required movement of the valve, is moved by a tappet-arm, *i*, on the piston-rod striking one of its nuts or fixed collars *k k'*. The valve-seat has two cavities, *j j'*, outside the steam-ports *a a'*, to allow the steam to pass under the ends of the valve to the steam-ports.

The operation of the valve is effected in the following manner: When the engine-piston arrives near the end of its stroke, and the tappet-arm on its rod strikes one of the nuts on the valve-rod, it causes the valve-driver C to slide over the back of the valve some distance before moving the valve, and by the time the end *d'* or *d''* has come in contact with the end of the valve to commence moving it on its seat, the arm *e* passes its line of culmination, and the pressure of the steam, which is always acting on the piston E to force it toward the valve, then causes the arm *e* to be thrown suddenly over, giving the piston E, cylinder D, and driver C all a quick movement to reverse the position of the valve. This will be better understood by reference to Fig. 1, where the valve is represented in black outline at the left-hand end of its stroke, and the driver C, cylinder D, and piston E are represented at the same end of their stroke in blue outline, the port *a* taking steam and the port *a'* exhausting. The engine-piston is shown in blue to have arrived near the end of its stroke and the tappet *i* to be just coming into operation. The tappet moves the driver C to the left till it arrives in the position shown in black outline, when the arm *e*, having passed its line of culmination, allows the pressure of the steam on the piston E to throw the piston and valve-driver to the position shown in red outline, where it is stopped by the valve-driver striking the end of the steam-chest. This movement from the black to the red position reverses the valve, opening the port *a'* to the steam and *a* to the exhaust, ready for the piston to commence its return. A similar operation takes place at the opposite end of the stroke of the piston, returning the valve to the position shown in black and the other parts to the position shown in blue.

It will be understood that when the valve-driver is fitted to the back of the valve to form a cap thereto, as described, the piston E takes so much of the pressure off the back of the valve as is due to its area, and the pressure acting upon the ends of the cylinder D and the part of the driver surrounding it is balanced as far as is desirable by the steam in the cavities *j j'* acting below the valve and driver; but as the balancing of the valve or relieving it of pressure is considered by us as a matter of minor importance, and the valve may be operated, as described, by the driver without being balanced, we do not confine ourselves to the particular construction of the valve and driver as represented in the drawings.

As instances of the many ways of applying the driver without balancing the valve, we will just mention that two short slide-valves of the common form, working each over one steam-port and an exhaust-port, may be used, said valves being connected together at their sides by narrow strips, between which the driver—consisting of a flat plate with a cylinder substantially like that first described—may work directly on the valve-seat. The rock-shaft F and rocker *e* will then be arranged to work in a cavity provided in the valve-seat to receive them. Again, the driver may be arranged to work on a seat at one side of the valve-seat. In any case, however, the valve-driver will be relieved of pressure to such an extent as is due to the area of the piston.

What we claim as our invention, and desire to secure by Letters Patent, is—

Giving to the valve the whole or part of the movement necessary to effect the change in the direction of the movement of the engine-piston by means of the steam acting upon a piston, E which is fitted to work perpendicularly to the valve in a cylinder, D, forming a part of the valve driver or device employed to drive the valve, and is supported against the pressure of steam by a rocker, *e*, or its equivalent, by which it is caused to operate on the valve-driver, substantially as herein set forth.

WM. H. GUILD.
WILLIAM F. GARRISON.

Witnesses:
WM. TUSCH,
JAMES F. BUCKLEY.